（12）United States Patent
Araújo et al.

(10) Patent No.: US 11,733,777 B2
(45) Date of Patent: *Aug. 22, 2023

(54) METHOD FOR CAPTURING HAPTIC CONTENT IN MULTIPLE COMMUNICATION DEVICES

(71) Applicant: Telefonaktiebolaget LM Ericsson (publ), Stockholm (SE)

(72) Inventors: José Araújo, Stockholm (SE); Zeid Al-Husseiny, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 120 days.

This patent is subject to a terminal disclaimer.

(21) Appl. No.: 17/215,870

(22) Filed: Mar. 29, 2021

(65) Prior Publication Data

US 2021/0216143 A1    Jul. 15, 2021

Related U.S. Application Data

(63) Continuation of application No. 16/767,864, filed as application No. PCT/EP2017/082216 on Dec. 11, 2017, now Pat. No. 11,003,252.

(51) Int. Cl.
*H04B 3/36* (2006.01)
*G06F 3/01* (2006.01)
*G08B 6/00* (2006.01)

(52) U.S. Cl.
CPC ............ *G06F 3/016* (2013.01); *G08B 6/00* (2013.01)

(58) Field of Classification Search
CPC .......... G06F 3/016; G06F 3/014; G08B 6/00; G01B 2210/58; G01B 5/207; G01B 5/28; G01B 7/287; G01L 5/226
See application file for complete search history.

(56) References Cited

U.S. PATENT DOCUMENTS 8,098,234 B2   1/2012 Lacrois et al.
8,717,151 B2   5/2014 Forutanpour et al.
(Continued)

FOREIGN PATENT DOCUMENTS

CN   103257783 A   8/2013
CN   103607395 A   2/2014
(Continued)

OTHER PUBLICATIONS

Russian Decision on Grant and Search Report dated Dec. 16, 2020 for Russian Patent Application No. 2020122676, 9 pages (English Translation).

(Continued)

*Primary Examiner* — Toan N Pham
(74) *Attorney, Agent, or Firm* — Sage Patent Group

(57) ABSTRACT

A method of capturing haptic content of an object, where the capturing involves a plurality of communication devices includes recognizing haptic content captured by a first communication device and properties associated with the captured haptic content and recognizing properties associated with a second communication device, and determining, at least partly based on the acquired properties, whether or not the second communication device is to participate in the capturing of the haptic content. Haptic content captured by the second communication device is then recognized by the haptic device, and a combination of the haptic content captured by the first communication device with the haptic content captured by the second communication device, can then be initiated. A haptic device and a system, capable of executing the method suggested above are also described.

12 Claims, 6 Drawing Sheets

(56) References Cited

U.S. PATENT DOCUMENTS

| | | | |
|---|---|---|---|
| 9,291,544 | B1 | 3/2016 | Boyer et al. |
| 10,067,566 | B2 | 9/2018 | Wang et al. |
| 10,775,894 | B2* | 9/2020 | Maalouf ................. G06N 20/00 |
| 11,003,252 | B2* | 5/2021 | Araújo ..................... G08B 6/00 |
| 2015/0268722 | A1* | 9/2015 | Wang .................... A63F 13/843 |
| | | | 345/156 |
| 2017/0032630 | A1 | 2/2017 | Gervais et al. |
| 2020/0076866 | A1 | 3/2020 | Wu et al. |
| 2020/0241643 | A1 | 7/2020 | Kim et al. |

FOREIGN PATENT DOCUMENTS

| | | |
|---|---|---|
| CN | 104922899 A | 9/2015 |
| JP | H06 294630 A | 10/1994 |
| RU | 2461865 C2 | 9/2012 |
| RU | 2571552 C2 | 12/2015 |

OTHER PUBLICATIONS

International Search Report and Written Opinion of the International Searching Authority, PCT/EP2017/082216, dated Aug. 13, 2018, 12 pages.

Search Report dated Mar. 15, 2023 for Chinese Patent Application No. 2017800976097, 2 pages.

* cited by examiner

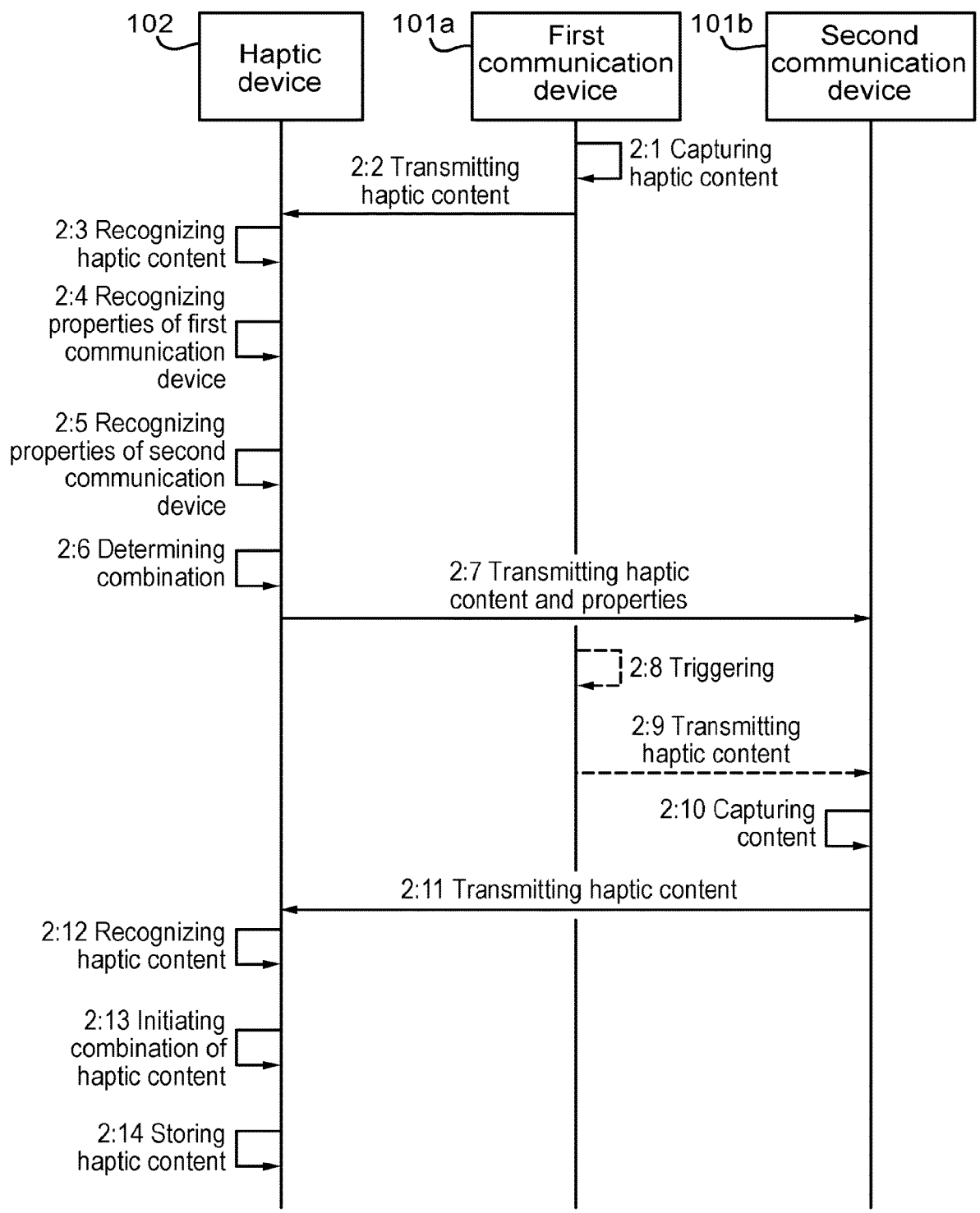

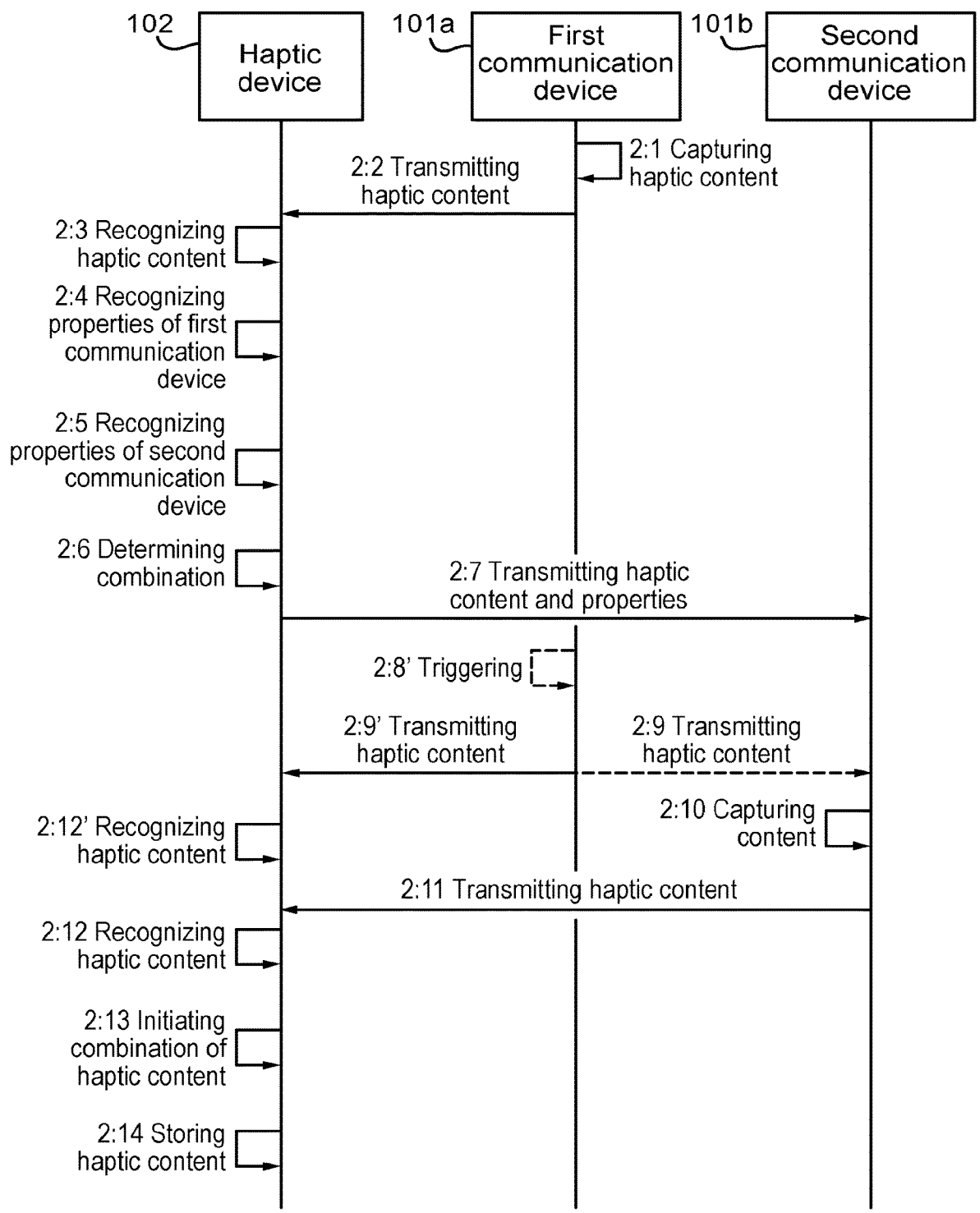

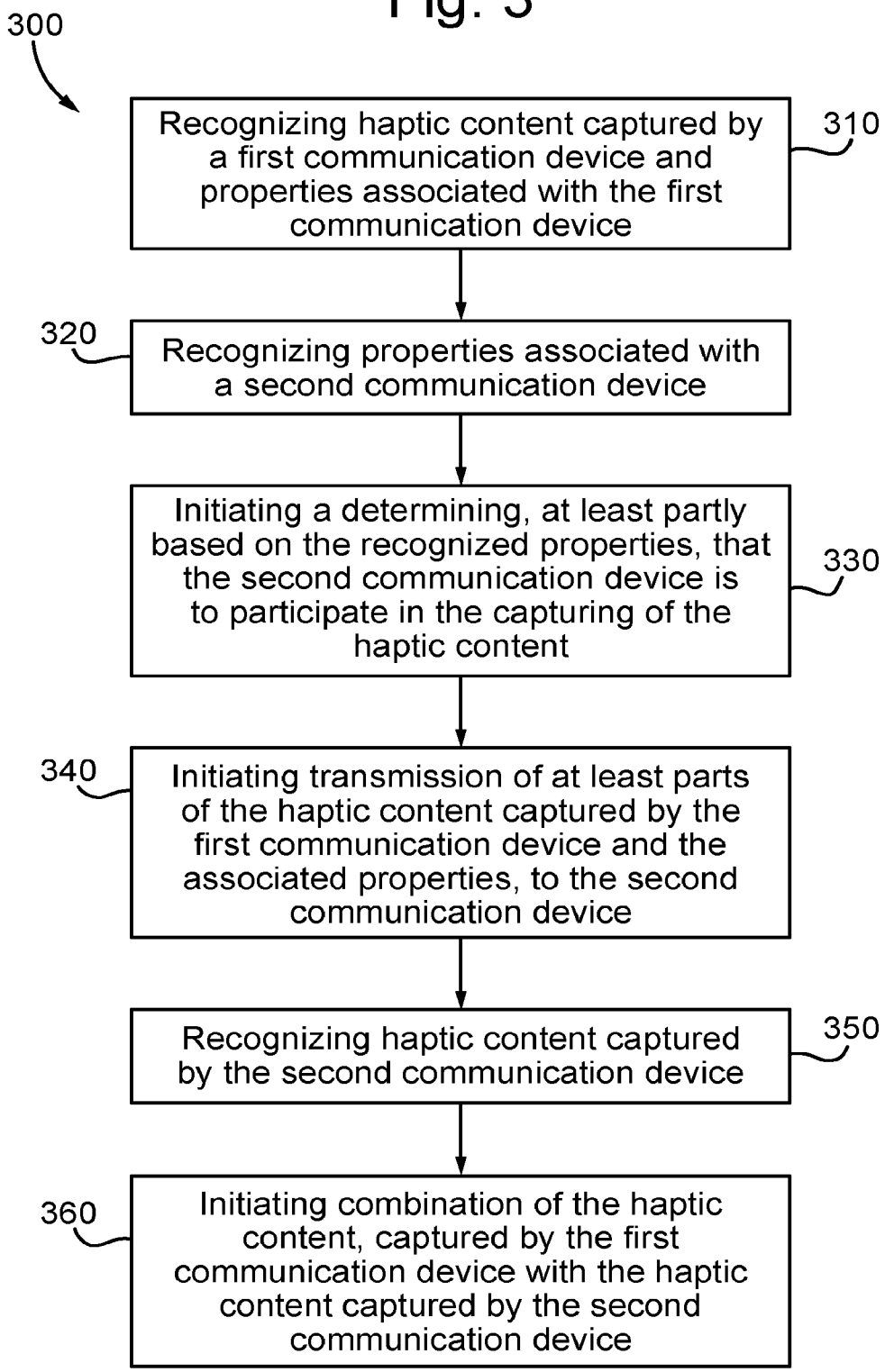

METHOD FOR CAPTURING HAPTIC CONTENT IN MULTIPLE COMMUNICATION DEVICES

CROSS-REFERENCE TO RELATED APPLICATIONS

This application is a continuation of U.S. patent application Ser. No. 16/767,864, filed on May 28, 2020, now U.S. Pat. No. 11,003,252, issued on May 11, 2021, which is a 35 U.S.C. § 371 national stage application of PCT International Application No. PCT/EP2017/082216 filed on Dec. 11, 2017, the disclosure and contents of which are incorporated by reference herein in their entirety.

TECHNICAL FIELD

The present disclosure relates to methods and arrangements for capturing haptic content when more than one communication device is involved in the mentioned capturing.

BACKGROUND

The haptic or tactile Internet can be considered as a next step towards mobile interworking. While users are currently able to efficiently communicate over voice and video, it is envisioned that, in the near future networked society, people will commonly be able to communicate also the sense of touch via haptic devices. In the past years there has been a large amount of research on devices which allow such communication to take place. Several new haptic devices are being developed, particularly devices that can be worn by a user, such as e.g. gloves, vests, but also handheld devices, such as e.g. smartphones and smartwatches, have been adapted for being usable as what can be referred to as haptic devices. Various haptic actuator technologies, such as e.g. ultrasound, vibrotactile, electrostatic, piezoelectric and other mechanical solutions are also available.

Haptic perception comprises kinesthetic and tactile sense and can relate to various sensations, including e.g. size, shape, mass, texture and stiffness of physical objects and surfaces. Kinesthetic information can refer to the information perceived e.g. when moving joints, muscles and/or tendons of a human, while tactile information may e.g. refer to descriptive information of an object retrieved via the skin of a human.

Several solutions for various types of handheld or worn devices consider the interaction with a user interface, or they provide haptic feedback with respect to an image which is being displayed in the touchscreen of the device. In other use cases, two users, using a respective haptic device, may transmit the sense of touch between each other by interacting with the display of the respective haptic device in real-time. Each user will be able to receive haptic feedback with respect to haptic properties, such as e.g. texture, friction or stiffness, of a user interface, image, object, or the other user's finger, when placed on a specific location, if the device is capable of tracking the position of the finger. By applying a piezoelectric, actuated screen on a device that device may also be able to generate various friction and texture effects e.g. via vibration.

It is envisioned that future user interaction technologies, such as touchscreens and wearables will provide users with additional and improved haptic feedback. Furthermore, flexible devices and wearables are seen as becoming ubiquitous in people's lives in the future, where such flexible devices will range from textiles and clothing to smartwatches, as well as handheld devices, including smartphones and tablets.

It is a desire to make sure that a high quality final haptic related product is obtained also in situations when more than one communication device is used for capturing the haptic content.

SUMMARY

It is an object of the present document to address, or at least alleviate, at least some of the problems described above.

More specifically, according to one aspect, a method of capturing haptic content of an object, in a situation when the capturing involves a plurality of communication devices, is suggested, where the method comprises recognizing haptic content, captured by a first communication device and properties associated with the captured haptic content, and recognizing properties associated with a second communication device. The method is continued by initiating determining, at least partly based on the recognized properties, that the second communication device is to participate in the capturing of the haptic content, after which transmission of at least parts of the haptic content, captured by the first communication device and the associated properties, to the second communication device, is initiated. Once haptic content captured by the second communication device is recognized, a combination of the haptic content captured by the first communication device with the haptic content captured by the second communication device is initiated.

By applying the method suggested above, a more optimized capturing of haptic content can be obtained, since advantages and/or trade-offs between different communication devices can be exploited in an optimized way.

The mentioned properties may comprise e.g. one or more of: haptic sensor related characteristics; haptic actuator related characteristics; type of object; type of haptic data, and communication device related characteristics.

The suggested determining step can be initiated based on the recognized properties in combination with e.g. at least one of: the location of the second communication device; difference in capabilities between the first and the second communication device; the distance between the first and the second communication device, and the quality of the haptic information captured by the first communication device.

According to one embodiment, the mentioned initiation of the transmission also comprises initiation of transmission of data providing instructions to the second communication device on how to capture haptic data on the second communication device.

According to yet another embodiment, also synchronizing data is provided to the two communication devices, in order to enable time synchronization of the first communication device with the second communication device.

The transmitted data may comprise at least one of: data instructing on where on an object displayed on the second communication device to start capturing haptic content; data instructing on how on an object displayed on the second communication device haptic content is to be captured; data instructing on how the second communication device is to be oriented; data instructing on where on an object displayed on the second communication device haptic content has already been captured, and data instructing on to what extent already captured haptic content has been captured.

According to one embodiment, the recognition of haptic content captured by the second communication device is combined with recognizing properties associated with the capturing of haptic content by the second communication device.

According to one embodiment, the suggested determining comprises initiating selection of haptic data and properties, captured by the first communication device, to be transmitted to the second communication device.

The combining may comprise at least one of combining haptic content captured by the communication devices in parallel, and combining haptic content captured sequentially by each of the communication devices.

According to another aspect a haptic device for capturing haptic content of an object is suggested, where the haptic device is capable of involving a plurality of communication devices. Such a haptic device is configured to execute a method according to any embodiment described above.

According to yet another aspect, a haptic device for capturing haptic content of an object when involving a plurality of communication devices, is suggested, where the haptic device comprise a processing circuitry and a memory, comprising executable instructions, which when executed on the haptic device causes the haptic device to execute a method such as the one described above.

By providing such a system, the haptic device will be capable of supervising or controlling capturing of haptic content, when involving more than one communication device, so that enhanced haptic content can be obtained.

BRIEF DESCRIPTION OF DRAWINGS

Embodiments will now be described in more detail in relation to the accompanying drawings, in which:

FIG. 2a is a signalling scheme illustrating how a haptic device will be able to interact with two communication devices, according to one embodiment.

FIG. 2b is another signalling scheme, illustrating how a haptic device will be able to interact with two communication devices, according to another embodiment.

FIG. 3 is a flow chart, illustrating a method executed in a haptic device.

DETAILED DESCRIPTION

Figure 1:
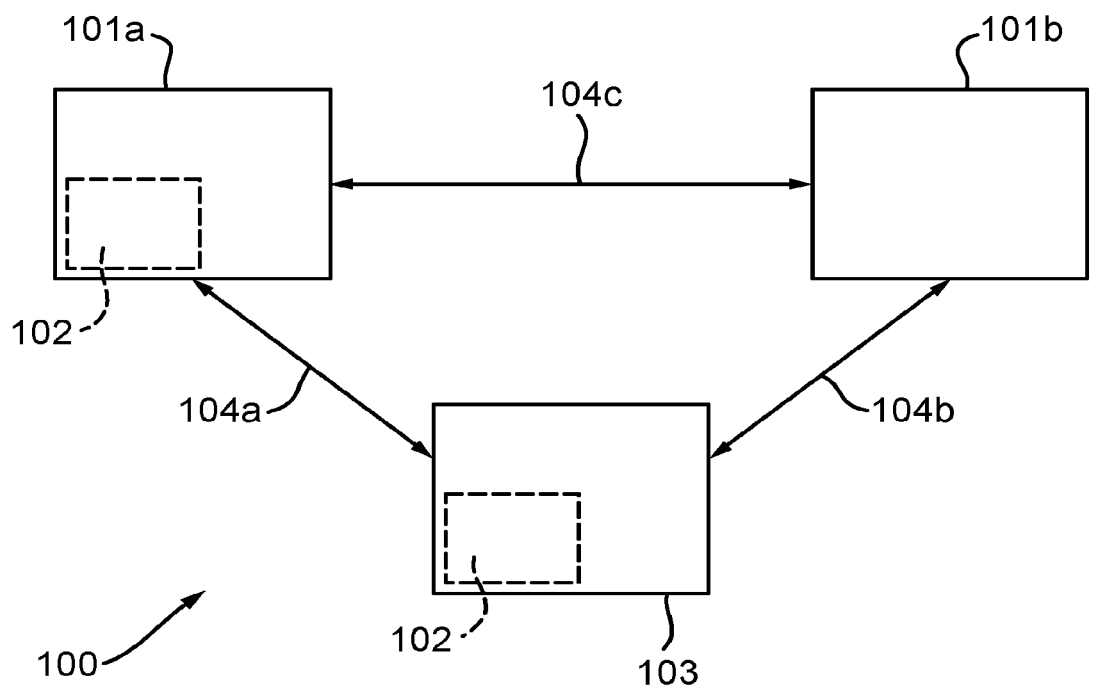
FIG. 1 is an overview of a system in which a method as described herein can be applied.

When capturing haptic content associated with a specific object there are situations when it is considered insufficient to complete an initiated capturing using one and the same communication device. Often capabilities related to haptic sensing, sensing ranges, and resolutions, to mention just a few properties relevant for capturing haptic content, differs from device to device, thereby also making difference to the final result of the capturing, depending on which type of device that has actually been used. A communication device, which is considered to be sufficiently good for capturing e.g. a specific surface of an object, having certain properties may have considerable drawbacks, and therefore be more or less suitable or even unsuitable, for capturing other properties of the same, or another surface. A communication device may be about to run out of battery, and, instead of re-doing an initiated capturing of haptic content all from the beginning, it may be more advantageous to be able to instead continue the capturing on another communication device, while still being able to make use of all captured haptic content that has already been captured.

A situation may also arise where a first communication device is very suitable for capturing one or more specific properties, while another communication device is more suitable for capturing one or more other properties, when a user wants to make use of the advantages of both communication devices. In the latter situation, a method is suggested where haptic content captured by both communication devices can be automatically combined, or aggregated, so that optimized haptic content is provided as a final product. A user may also face a situation where haptic content is initially captured when using a stationary communication device, e.g. when sitting in a room, after which the user decides to continue capturing haptic content while walking, where such a transition may require a change of communication device to a mobile one.

Haptic technology, and the considerations which are relevant when handling such content, differs from handling of other media technologies, such as e.g. audio and video technologies, in a number of aspects.

Haptic content can e.g. be widely heterogeneous, where each relevant property may be independent or dependent of another relevant property. In a single haptic data file, representing captured haptic content, properties, such as e.g. texture, friction, stiffness and/or motion, may be considered, all with different mutual dependencies.

Haptic content also typically requires multiple sensors and actuators to be able to capture, record and render a plurality of desired properties, which is different from a situation where e.g. audio and video is instead captured, where typically one single sensor and one single actuator, specially adapted therefore, are sufficient.

Capturing of haptic content is also, to a large extent, location dependent. Tactile vs. kinesthetic haptic content, as well as haptic content captured or rendered on different parts of a body, such as e.g. on a hand, arm, head, or feet differs, since different body parts have different sensitivity to haptic feedback. Different body parts are also capable of sensing and actuating with different amplitudes and within different ranges of motion and force. This also differs from handling audio or video, which again are normally capable of capturing relevant properties with one single type of sensors only.

Capturing of haptic content also requires an active participation from a user, who is interacting with an object, forming part of the haptic system. In many situations such a user interaction also, at least to some extent, modifies respective haptic content or data when actuating with the object, thereby, more or less, effecting the final user experience.

Haptic content also, in many situations, requires very low latency, such as e.g. when applied in a teleoperation based scenario, such as e.g. when a user is remotely manipulating a robot in real-time via a kinaesthetic haptic device. For latencies above 10 ms, the haptic perception of such a user may be severely reduced, since, in such a scenario, the user may not be able to correctly feel relevant haptic properties of the environment, or a required level of stability of the robot and haptic device may no longer be guaranteed.

Consequently, each of the issues mentioned above are issues that may need to be considered when capturing or composing haptic content with more than one capturing device.

Problems, such as the ones mentioned above, may become evident e.g. when one or more users is/are using multiple haptic devices simultaneously or sequentially, for the purpose of capturing haptic content for delivery and rendering to another entity, or for storage for later retrieval and rendering by a suitable entity.

In order to, efficiently, handle at least some of the potential problems mentioned above, a method is suggested for coordinating haptic content provided from a plurality of communication devices. Although the present document describes a method for handling content provided from two communication devices, it is to be understood that the described method is applicable also if more than two devices are used for the mentioned purpose. In the latter situation, the described method can be repeated for the plurality of communication devices which are considered needed under the present circumstances.

Briefly described, a method is suggested where capturing of haptic content by using a first communication device is initiating a process where it is determined if there is any further communication device available, i.e. if any further communication device, which is capable of capturing haptic content in parallel, or following the capturing of the first communication device, can be accessed and used for the mentioned capturing purpose. If another communication device is accessible and selected, haptic content captured by the two communication devices is combined or aggregated, after which it can be transmitted to an intended recipient, or stored at a local or distributed storage or memory, for later retrieval and rendering. The method handles which data, or properties, that are to be exchanged between any of the devices or any other entity. The method is also capable of providing assistance to a user or function on how to proceed with capturing of haptic content when applying a plurality of communication devices in an optimized way.

In addition to suggesting a method which can be used in a scenario, such as any of the ones suggested above, a device configured to execute such a method is also suggested. Such a device, which may either be configured as forming part of one of the involved communication devices, or as forming part of a separate, third entity, or node, typically in the form of a server, or any other entity comprising corresponding functionality, will from hereinafter be referred to as a haptic device.

By capturing we here mean any way of reproducing haptic content, or a haptic effect, associated with, or descriptive of, a specific part of an object, where the haptic effect can be represented by one or more properties indicative of the surface of the object. The properties may comprise any type of haptic data that can be captured, such as e.g. texture, friction, stiffness, motion or temperature. Properties may also comprise one or both of haptic sensor related characteristics and haptic actuator related characteristics, which e.g. specifies working ranges, resolution and/or tolerances. The mentioned properties may also comprise information on type of object, such as e.g. fabric, wood, stone or ceramics, and communication device related characteristics, such as e.g. memory capacity, device shape or type (form factor, e.g. glove, vest, smartphone), battery level and display size. The mentioned capturing may alternatively be referred to as composing, or sensing, where the required properties are captured by applying actuators and sensors. The sensors and actuators either form part of a respective communication device or are connected to a respective communication device, wherein the sensors and actuators may be attached to, or integrated with, a wearable, a handheld device or any other type of device which is capable of handling the respective properties, accordingly. The sensors may comprise e.g. one or more force sensors, touch sensors, temperature sensors and/or inertial measurement units, while the actuators may comprise e.g. ultrasonic transducers, vibration motors, such as e.g. eccentric rotating mass motors and linear resonant actuators, electrostatic actuators, piezoelectric actuators, electric motors, flexible actuated materials, such as e.g. elastomers, and/or shape memory alloy actuators) and/or thermal actuators.

A system in which the method suggested herein can be executed, will now be briefly described with reference to FIG. 1. It is, however, to be understood that the described system is a simplified overview, where only entities which are relevant for the understanding of the suggested method are presented and described, while other entities, commonly used by known communication system, such as e.g. access nodes and core nodes, have been omitted for simplicity reasons.

The system 100 of FIG. 1 comprises a first communication device 101a and a second communication device 101b, both capable of capturing haptic content of an object. The communication devices 101a,101b, may be e.g. any of a smartphone, smartwatch, pad, wearable, such as e.g. a haptic glove or vest, or any type of communication device which is capable of capturing haptic content. The system 100 also comprises a haptic device 102, which is capable of executing a method as suggested herein, and which can be implemented according to one of the two embodiments shown in FIG. 1. According to one embodiment, such a haptic device 102 forms part of a separate entity 103, typically configured as a server, or as a device providing server functionality, where the server or server functionality is capable of providing one or more haptic related services to the mentioned communication devices 101a,101b. According to a second embodiment, the haptic device 102 instead form part of any of the mentioned communication devices 101a,101b, here presented as forming part of communication device 101a. In the former case information exchange 104a, 104b associated with the suggested methods is executed between the communication devices 101a,101b via the separate entity 103 and its haptic device 102, while in the latter embodiment, corresponding information exchange 104c is instead executed directly between the two devices 101a,101b. However, even though signalling and data exchange here is described to be executed, either directly device to device, or via an intermediate device 103, it is to be understood that in both embodiments information exchange may, and typically will, be executed via one or more additional intermediate entities or nodes constituting a communication network, which entities or nodes are, however, out of the scope of this document. As will be elaborated further below, complete processing of one or more steps of the suggested method may be executed by the haptic device itself, or by functionality distributed into one or more separate entities or nodes (not shown), which may form part e.g. of a cloud based solution. In the latter case, a haptic device comprise functionality for triggering, or initiating, the suggested combination of haptic content, while, for various efficiency purposes, all or parts of the actual processing can be executed elsewhere.

A scenario where a haptic device 102 is arranged in, or as, a separate entity, serving a plurality of communication devices, here represented by a first communication device 101a, and a second communication device 101b, will now be described below with reference to FIG. 2a. However, the scenario described above is also applicable if the haptic device 102 forms part of one of the communication devices 101a,101b. The present scenario is representing a situation where haptic content is captured sequentially on two communication devices, i.e. haptic content is first captured on one communication device, after which capturing is continued on another communication device. As a prerequisite, it is assumed that a user of function has initiated capturing of haptic content on one of the communication devices 101a, here represented by the first communication device 101a, as indicated with first step 2:1. In addition to capturing haptic content and processing such content accordingly at the first communication device 101a, the captured haptic content is also made available to the haptic device 102, as indicated with step 2:2. Transmission of haptic content from the first communication device 101a to the haptic device 102, can, according to one embodiment, be initiated by the first communication device 101a. Alternatively, the haptic device 102 is configured to initiate a process for monitoring haptic content, captured by the first communication device 101a.

In another step 2:3, the haptic device 102 recognise haptic content, provided from the first communication device 101a. In addition, the haptic device 102 recognise properties associated with the first communication device 101a, as indicated with a step 2:4. Such properties can, according to one embodiment be received from the first communication device 101a together with the haptic content, i.e. be included in step 2:2, or, according to another embodiment be provided in a separate message, received from the first communication device 101a. Alternatively, all, or some of the recognised properties may be already available from a storage, accessible to the haptic device 102.

In response to receiving haptic content from a communication device 101a, the haptic device 102 also acquires haptic properties associated with one or more communication devices, other than the first communication device 101a, here represented by the second communication device 101b, as indicated with step 2:5. According to one embodiment, these properties are already available at a storage of the haptic device 102. Communication devices may e.g. be configured to automatically transmit selected properties to the haptic device 102, when the second communication device 101b is activated or when a certain function is activated at the second communication device 101b. Alternatively, the haptic device 102 request relevant properties from selected communication devices, where the selection may be done such that e.g. all communication devices that are active, all active communication devices within a certain range of the first communication device 101a, all active communication devices fulfilling specific quality criteria, or a combination of one or more of the mentioned conditions. Static properties may e.g. be pre-stored at the haptic device 102, while dynamic properties are requested by the haptic device 102 upon request, or when changed.

Based on the properties, possibly in combination with the haptic content, the haptic device 102 will, at this stage, be able to determine whether any communication device, other than the first device 101a, in the present case, the second communication device 101b, is to participate in the capturing of haptic content, which is ongoing at the first communication device 101a. In case this is determined, a process for combining haptic content, captured by more than one communication device, will be initiated, as indicated with step 2:6, while in case no such determination is stated, the capturing at the first communication device 101a will continue in a conventional way, possibly by support from the haptic device 102. Such a determination may e.g. be based on a comparison of the properties of the two communication devices 101a,101b, where it is found that, the second communication device 101b is more suitable to use for capturing the present haptic content, and, thus, a switch over from the first communication device 101a to the second communication device 101b is preferred, based on rules and conditions presently applied by the haptic device 102.

As indicated above, this determination may be based on an evaluation of some or all of the available properties alone, or on an evaluation of properties in combination with the haptic content captured so far by the first communication device 101a. In the latter case, bad quality or uncertainty in quality of the captured haptic content may trigger a switch to the second communication device 101b. In the present scenario, the actual determination is executed by the haptic device 102. However, according to an alternative scenario, the haptic device 102 may trigger such a process, while the actual execution is executed by a remotely located functionality, e.g. by functionality arranged according to a distributed cloud solution. In a similar manner, one or more of preceding steps 2:3, 2:4 and 2:5 may be executed remotely, only making the haptic device 102 aware of conclusions which are required for going forward in the described process. By allowing such distribution of functionality, delay of one or more of the mentioned decisions may be reduced.

Once it has been determined, in step 2:6, that the second communication device is to be included in the process of capturing haptic content, a transmission of, at least parts, of the haptic content captured by the first communication device 101a and associated properties, is initiated by the haptic device 102, as indicated with step 2:7, where haptic content and properties, accessible to the haptic device 102 is transmitted to the second communication device 101b. The mentioned process may e.g. follow the rule that only the haptic content captured during the last 3 minutes is transmitted, together with properties relevant for the continuing, upcoming capturing by the second communication device 101b.

Instructions, instructing how to capture haptic content on one or both of the communication devices can also be provided in step 2:7, either in combination with the already mentioned information, or sent as one or more separate messages. As indicated with optional step 2:8, the mentioned process may additionally comprise that the haptic device 102 is triggering the first communication device 101a to take some action, such as e.g. to determine which haptic content to be provided from the first communication device 101a to the second communication device 101b. In the latter case, step 2:7, or a separate step (not shown) initiates step 2:8 at the first communication device 101a, and further haptic content may e.g. be transmitted to the second communication device 101b, before the switch from the first to the second communication device is executed, e.g. in order to obtain a continuous stream of haptic content. Such further content, triggered in step 2:8, is transmitted to the second communication device 101b in optional step 2:9. Step 2:10 is indicating capturing of haptic content by the second communication device 101b, based on the haptic content and properties acquired by the second communication device 101b. As a result of the capturing at step 2:10, haptic content, captured in step 2:10 is now transmitted to the haptic device 102, as indicated with step 2:11.

It is to be understood that step 2:10 may be initiated already after step 2:7, and that this process can continue on a continuous basis, if the described process is repeated, starting at step 2:1.

As indicated with another step 2:12, the haptic device 102 is recognizing haptic content, captured by the second communication device 101b. In another step 2:13 the haptic device 102 is initiating a combination of haptic content, acquired from the communication devices 101a,101b. The present example is describing a scenario where haptic content is captured sequentially by different communication devices. It is, however, to be understood, that one or more steps of the process described above may be repeated e.g. so that sequentially executed capturing of haptic content is repeated by a plurality of communication devices, where each capturing is based on differ properties, thereby making use of the advantages of each communication device. More specifically, steps 2:6-2:12 can be repeated for a plurality of communication devices, where the result from the different communication devices is combined in step 2:13. In such a scenario, instructions may be provided to the communication devices, instructing each capturing on a respective communication device to restart from the same position of an object of interest, each time taking different properties into consideration. In a step 2:14 the result of the combined capturing can be stored for immediate or later use.

Another alternative scenario, where instead capturing is done in parallel by a plurality of communication devices, again illustrated with a separate haptic device 102, a first communication device 101a and a second communication device 101b, will be presented below, with reference to FIG. 2b. Also this scenario is applicable to a situation where the haptic device 102 forms part with one of the communication devices 101a.

The first steps 2:1-2:10, with exception of step 2:8, are executed as in the scenario presented above, with reference to FIG. 2a, and will therefore not be repeated here. However, in addition, step 2:8 of FIG. 2a, here instead referred to as 2:8' is in addition to what has been said about step 2:8 above, determining what haptic content to provide to the haptic device 102, in a subsequent transmitting step 2:9'. Thereby, haptic content from both the first communication device 101a and the second communication device 101b will be recognized by the haptic device 102 in parallel, as will be described in further detail below. It is to be understood that more than two communication devices can be used in any of the processes described herein, whereby the relevant steps will be repeated for exchanging relevant data also from these communication devices. It is also to be understood that the two scenarios described above can be combined, such that some haptic content can be captured sequentially, while other content is captured in parallel, thereby striving for an optimized capturing process. Furthermore, as already mentioned above, the haptic device 102 may, according to one embodiment, form part of one of the communication devices, whereby signalling between the haptic device 202 and the functionality of the first communication device 101a for rendering and handling haptic content is executed internally within the communication device.

A method 300, which can be executed in a haptic device according to any of the two embodiments suggested above, will now be described with reference to FIG. 3.

In a first step 310 of FIG. 3, it is recognized that haptic content and properties associated with the captured haptic content has been captured by a communication device. By way of a first example, a user may touch the screen of a communication device 101a, with a finger, while according to a second example, the user is instead interacting with an object, wearing a haptic glove. According to a third example, a user may instead experience an activity, such as e.g. a roller coaster ride, wearing a device, such as e.g. a wearable, capable of capturing a haptic effect, as described herein.

In another step 320, properties associated with the second communication device 101b, are recognized by the haptic device 102. Based on acquired properties, possibly also in combination with the haptic content, it will now be possible to determine whether or not also the second communication device 101b is to participate in the capturing of haptic content, which has already been initiated by the first communication device 101a. Such an initiated determination is indicated in FIG. 3 by another step 330. Initiation of such a determination is to be understood as meaning either that both the actual initiation and determination is executed by the mentioned haptic device 102, or that, while the mentioned process is initiated, or triggered, by the haptic device 102, the actual processing of the acquired content, leading to the determination of whether or not also the second communication device 101b, is to participate in the mentioned capturing, is executed in another entity, e.g. in an entity forming part of a cloud related solution, which is accessible to the haptic device 102.

The determination mentioned above, can be initiated based on a combination of haptic content and properties, such that e.g. only communication devices located in a certain area, or close enough to the first communication device are considered as a communication device to consider for potential combination of haptic content. For location determination, any type of known location determination mechanism, applicable for locating communication devices can be applied. Step 330 comprises initiation of a determination that there is a potential for improvements of haptic content acquired from the first communication device 101a, by also involving a second communication device 101b. The determination 330 typically involves comparison of relevant parts of haptic content and properties obtained from the first communication device 101a, with one or more threshold values, rules and conditions, specifying requirements and conditions for captured haptic content. The mentioned determination, or initiation of determination, may require approval from a user before initiating a second communication device 101b in the capturing process. Such a user interaction may of course be even more relevant in case there are a plurality of communication devices to choose from. In the latter situation, a user may be presented with available options, possibly together with advantages, such as e.g. capabilities of the respective available communication devices. Alternatively, all determinations are executed automatically, providing a user with the option to accept or reject the presented option.

In case it is determined that only the first communication device 101a is to commence with the ongoing capturing, e.g. due to that no other communication device with sufficient capabilities is presently accessible to the user, the mentioned method is terminated, and the capturing of haptic content is commenced by the first communication device in a conventional way.

If, on the other hand, it is determined, in step 330, that the second communication device 101b is to be involved in the capturing, a further step 340 of initiating transmission of at least part of the haptic content, captured by the first communication device 101a, to the second communication device 101b, is executed. Such an initiation may comprise transmission of all haptic data captured by the first communication device 101a. Alternatively, only parts of the haptic content and properties, provided from the first communication device 101a is to be provided to the second communication device 101b. In the latter case, the initiation of the determining, according to step 330, further comprise selecting haptic content and properties provided from the first communication device 101a, to be transmitted to the second communication device 101b. Such a process can be referred to as an optional sub-step 335 (not shown) to step 330. It is to be understood, that the selection according to step 335 need to result in that haptic content and associated properties, sufficient for presenting the relevant object exposed to capturing of haptic content, can be executed.

Again, it is the initiation of the determination and/or transmission which is executed at the haptic device 102. Typically, such an initiation means that the first communication device 101a is instructed by the haptic device 102 to transmit, possibly also to select, according to step 335, certain parts of the captured haptic content, together with associated properties. Such selected haptic content may e.g. be limited to content indicative of specific movements and/or actuations of a user on an object, and/or may also be decisive of when a user stops interacting with the object on a first communication device 101a. In the latter case, such information may indicate when and where capturing is to be initiated on a second communication device 101b. Typically an event, such as the one mentioned above, also triggers transmission of instructions to a user of the relevant communication device, assisting a respective user on when and where to capture haptic content on an object. Such instructions are typically generated in association with determining that the second communication device is to participate in the capturing of haptic data, whereas the specific instructions will relate to the specific reasons or conditions for coming to such a conclusion, so that, based on the instructions, haptic content originating from both communication devices 101a, 101b, can eventually be combined in the most efficient way.

If e.g. the mentioned determining in step 330 is based on the fact that the first communication device 101a is about to become too low on battery for being able to continue to operate the actuators and sensors for capturing the respective haptic content, the instructions may comprise an instruction, instructing the user of the first communication device 101a to switch over to the identified second communication device 101b and to continue capturing haptic content on that device.

Figure 4A:
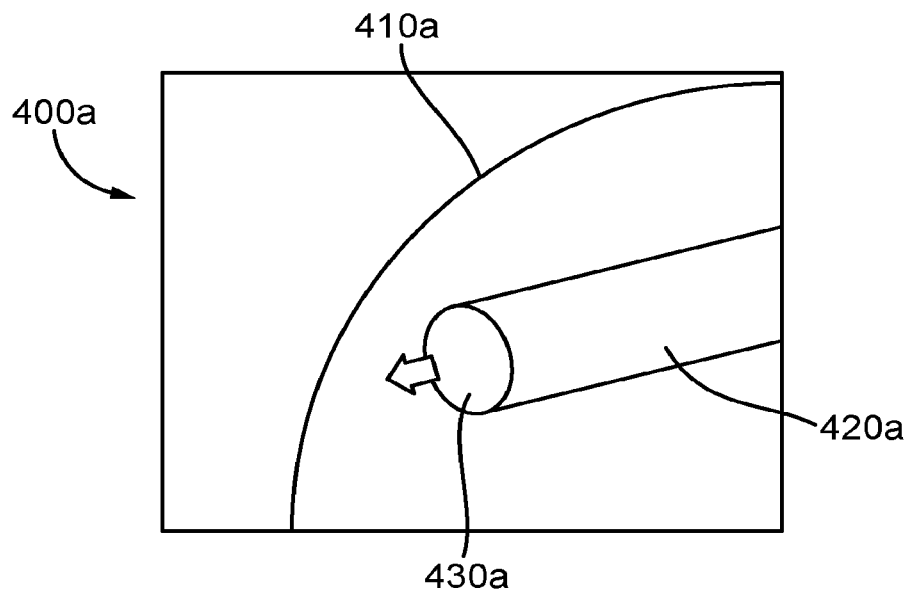
FIG. 4a is an exemplary view, illustrating how capturing of haptic content can be presented on a display of a communication device, according to one embodiment.

Instructions may e.g. instruct a user on where on a display to place a finger, carrying a haptic glove, where to place a haptic sensor pen, or how to place, or direct a haptic enabled smart phone. If e.g. a user chooses to perform a suggested switch of communication device in step 330, instructions, which may be initiated in response to the user making the mentioned choice, or upon execution of the switch, may be sent to the selected second communication device 101b, which instructs the user where on the respective object to commence capturing of haptic content. Such information, may e.g. have the appearance of the visual information, as presented in FIG. 4a, applicable in a situation when a user is switching from one communication device to another during capturing of haptic content, where a display view 400a on the second communication device is showing an object 410a, such as e.g. a cushion, a tracking or trace of where a user so far has completed capturing of haptic content on the first communication device 420a and a distinct spot 430a, where the user is expected to commence the capturing on the second communication device. In a similar manner, the speed, with which a user is expected to render haptic content, may be presented as visual information, presented e.g. as a moving indicator presented in another colour and/or as a distinguished pattern. Visual instructions of the presented type can be generated based on properties and haptic content provided in previous steps. Further indications, such as e.g. colour differentiation, shading of areas for already successfully captured haptic content, directive symbols, such as e.g. arrows, on the presentation may also be used to highlight or clarify the instructions, and may additionally be used e.g. as an indicator on how hard to press when recording haptic content, in order to keep in line with the capturing on the first communication device. In addition to indicating how to capture content, instructions may also be provided which instructs a user on how to orient the second communication device in order to simplify efficient capturing of haptic content. Since captured haptic content and its properties typically will differ, depending on how, and in which direction, the communication device is held and depending on the speed with which the haptic data is captured, the pose of the device, as well as the capturing direction and speed, may advantageously be maintained when switching between devices, in order to maintain a consistent and homogeneous capturing of given haptic content and its properties.

Figure 4B:
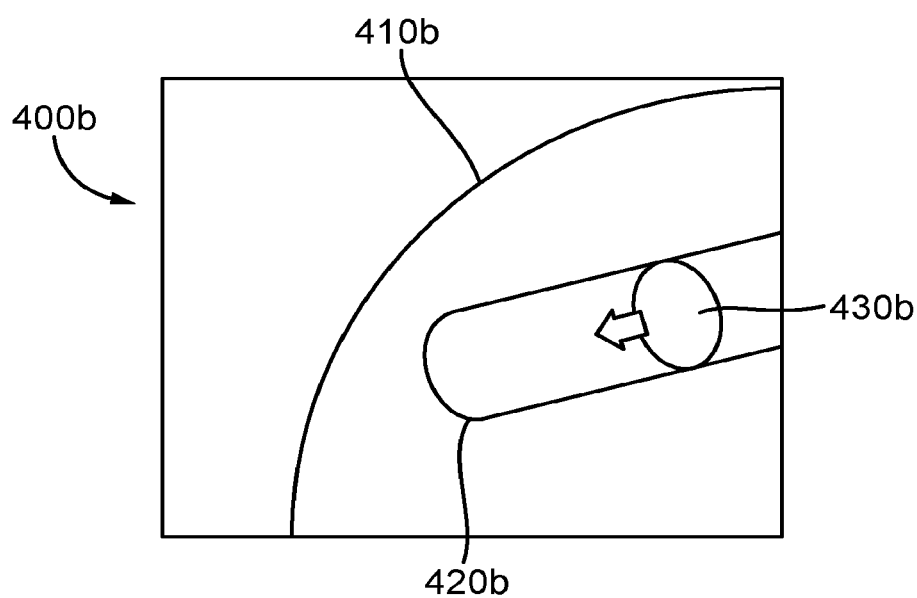
FIG. 4b is another exemplary view, illustrating how capturing of haptic content can be presented on a display of a communication device, according to another embodiment.

FIG. 4b is illustrating an alternative scenario, applicable when a user is supposed to repeat a capturing process that has been started on a first communication device on a second communication device, where a display 400b of the second communication device is showing an object 410b, and a pattern 420b along which a user has already captured haptic content on a first communication device, and a point 430b from where, and, as indicated with an arrow, in which direction, a user is to start capturing haptic content on the second communication device.

Instructions may alternatively, or in addition, include audible instructions to the user. The suggested types of instructions, created based on collection and processing of the mentioned data, may help a user to dynamically perform a consequent capturing process in real time, also when using different devices in parallel or when switching between devices during capturing of haptic content.

The transmission mentioned above may also comprise synchronisation information for synchronising a first communication device with one or more additional communication devices. This type of information will especially be relevant in case capturing of haptic content is executed simultaneously on different communication devices. The synchronisation precision will typically depend on the type of haptic content being captured. Furthermore, typically the synchronisation can be achieved in a distributed manner where the communication devices exchange information on their clocks and the properties of the clocks, or in a centralized manner, where a central communication device, which may or may not form part of the haptic device, transmits its clock to the haptic devices, which then align their local clocks with the clock of the central device. The synchronisation as such can be done according to known procedures for synchronising two communication devices with each other, and is therefore out of the scope of this document.

When again considering FIG. 3, the determination of step 330 typically is the result of an automatic determination, where the mentioned information provided from the two communication devices 101a,101b is being processed and compared against logic, arranged as pre-defined and/or adaptable rules and conditions, typically including pre-defined and/or adaptable threshold values, with the goal of providing optimized haptic content. Alternatively, the mentioned step is arranged as a semi-automatic step, where a user of at least one of the communication devices 101a,101b is provided with various options on how to combine haptic content which can be captured by the two communication devices 101a,101b. In the latter scenario, the mentioned steps typically comprise a dialogue between the user and decision logic of the haptic device 102 via a Graphic User Interface (GUI) of the respective communication device 101a,101b.

According to one possible scenario, a user capturing haptic content on a communication device can be instructed that there are e.g. two alternative communication devices available, one of which is stationary and one of which is mobile, where the mobile communication device have capabilities which are better suited for the ongoing capturing of haptic data than the stationary communication device, presently used. The user may then be provided with possible options and able to select whether to continue with capturing haptic data with only the first communication device 101a, or if it should be replaced with, or combined with, the other communication device. Once it has been determined that a second communication device 101b is to be considered, and that only certain haptic data is to be combined, only content, considered relevant for the second communication device 101b will be selected, and relevant instructions are generated, according to the mentioned selection.

According to another example, only content having a quality according to a specific quality property, e.g. captured haptic content which is found to be below a predetermined threshold value, is selected for transmission, in case such content is to be replaced, or complemented, by content captured by the second communication device 101b. Alternatively, selected data content, presented on a first communication device 101a as haptic content 301 is restricted to the content latest captured by the first communication device 101a, in case continuing capturing by the second communication device 101b is intended. Also the latter step can be executed as a fully automated step, which is following pre-defined and/or adaptable rules and conditions, or it can be executed as a semi-automated step, where e.g. a user is allowed to participate in the decision by selecting applicable options during a user interaction via a GUI, adapted therefore. Haptic content to be transmitted may e.g. be selected as the last 5 seconds of a 1D dimensional type composition.

Haptic content provided from any of the communication devices 101a,101b, may be 1, 2 or 3 D dimensional, such that e.g. haptic data of a piece of wood is provided as time-based 1D data, while, according to another example, haptic data, indicative of a sofa cushion is provided as a 2D image with corresponding 2D haptic content provided in each image pixel. During a time-based capturing process, properties indicating a current time instance and duration of the haptic data are normally provided. For both static and time-based capturing, coordinates of the present location of capturing on an object, as well as spatial coordinates, are comprised in the haptic data.

In another example, applicable for a 2D dimensional composition, only haptic data which is found to be located close to the region or zone of an object where a user has captured data, using a first communication device 101a, is selected for distribution to the second communication device 101b. At least parts of haptic data may also be selected and transmitted as a summarization of haptic data, captured during a certain time interval, while other parts of captured haptic data may be selected and transmitted intact.

Subsequent to the transmission, as indicated in step 340 of FIG. 3, haptic content captured by the second communication device 101b is recognized by the haptic device 102, as indicated in another step 350, and in a further step 360, haptic content captured by the two communication devices 101a,101b is combined. Also the latter step can be arranged as an automated or semi-automated step, based on the applied rules and conditions, which are arranged to specify how to combine the available haptic content. In case of one or more semi-automated steps, it is to be understood that the actual user interaction, where user preferences are selected, may be executed in association with the respective step, or at one or more occasions, associated with any of the steps mentioned above.

As already implied above, the mentioned combination may comprise a combination of content captured in parallel, sequentially, or as a combination of both, depending on whether content from plural communication devices 101a, 101b is to be used for improving the final outcome of the haptic capturing, or if haptic content is rather to be used for complementing each other. Typically, the way haptic data is to be combined will rely on the outcome of determining step 330, and possibly also on how haptic data was selected in step 235.

When haptic content associated with different properties hi(t), such as, e.g. texture, motion or force, provided from two communication devices 101a,101b at time t, are merged, in order to generate a haptic data vector, a vector H for time t, can be defined as:

$$H(t)=[h1(t); h2(t); \ldots ; hn(t)]$$

When haptic content associated with different properties hi(x,y,t), such as, e.g. texture, motion or force, provided from two communication devices at coordinates x,y, at time t are merged in order to generate a haptic data vector, a vector for position x,y, at time t can be defined as:

$$H(x,y,t)=[h1(x,y,t), h2(x,y,t); \ldots hn(x,y,t)]$$

For haptic properties which are not accessible, or which are not fulfilling certain criteria, such components will, for natural reasons, not be merged.

Once the haptic content has been combined it can either be sent to a recipient, or stored, either locally or remotely, on a memory or storage, for later retrieval and rendering. These are all steps which can be executed according to known procedures. Therefore, details on each of these steps have been omitted and is out of the scope of this document.

By applying the suggested method, a more bandwidth and energy efficient haptic related process can be obtained, where only data, i.e. haptic content and properties, which is needed for the mentioned process is selected and exchanged between involved entities.

Furthermore, exchange of appropriate instructions, generated based on the decisions on how to best combine haptic content, as suggested above, helps a user to proceed with capturing haptic content in a more efficient way, when switching from one device to another or, when capturing content, using more than one device simultaneously.

A haptic device 102, 500, 600 is configured for executing a method, according to any of the embodiments mentioned above when interacting with at least two communication devices. Such a haptic device 102, 500, 600 may be capable of executing hardware, software, or a combination of both.

Figure 5:
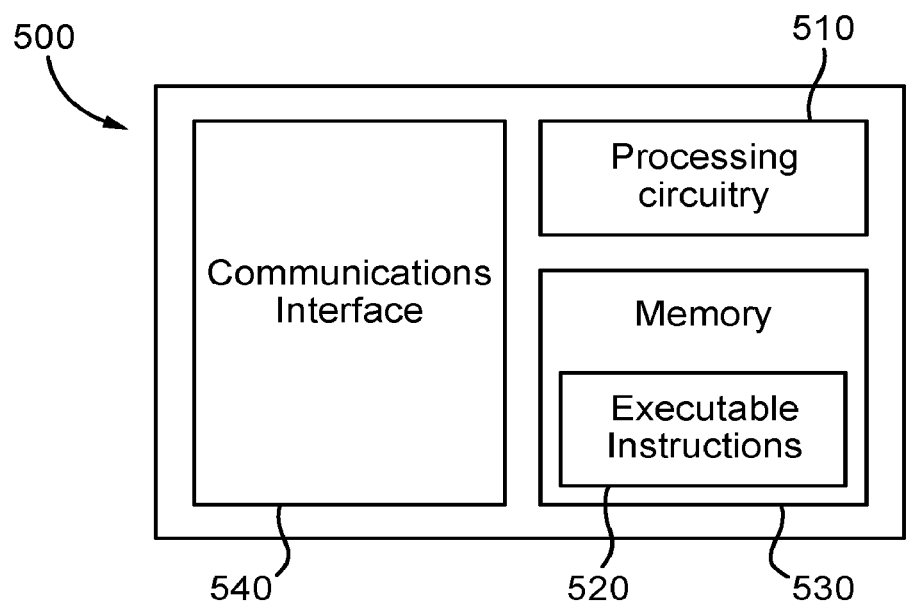
FIG. 5 is a block scheme illustrating a haptic device according to a first embodiment.

A haptic device 500, which, as mentioned above, according to one aspect, can form part of either one of the communication devices 101a, 101b, or of a separate device or node 103, will now be described in further detail with reference to FIG. 5. The haptic device 500 having processing circuitry, 510, comprising any combination of one or more of a suitable central processing unit (CPU), multiprocessor, microcontroller, digital signal processor (DSP) or application specific integrated circuitry, which is capable of executing executable instructions or code 520 stored in a memory 530, where the memory 530 can be any combination of random access memory (RAM) and read only memory (ROM). The memory 530 also typically comprises persistent storage, which, for example, can be any single one or combination of magnetic memory, optical memory, solid state memory or even remotely mounted memory. The haptic device 500, also comprise at least one communication interface 540, enabling the haptic device 500 to communicate with communication devices and network infrastructure, as described herein.

The haptic device 500, described above comprise the processing circuitry 510, and the software instructions, which when executed on the haptic device 500, operating as a haptics enabled computer, causes the haptic device 500 to execute a method according to any of the embodiments described above.

Figure 6:
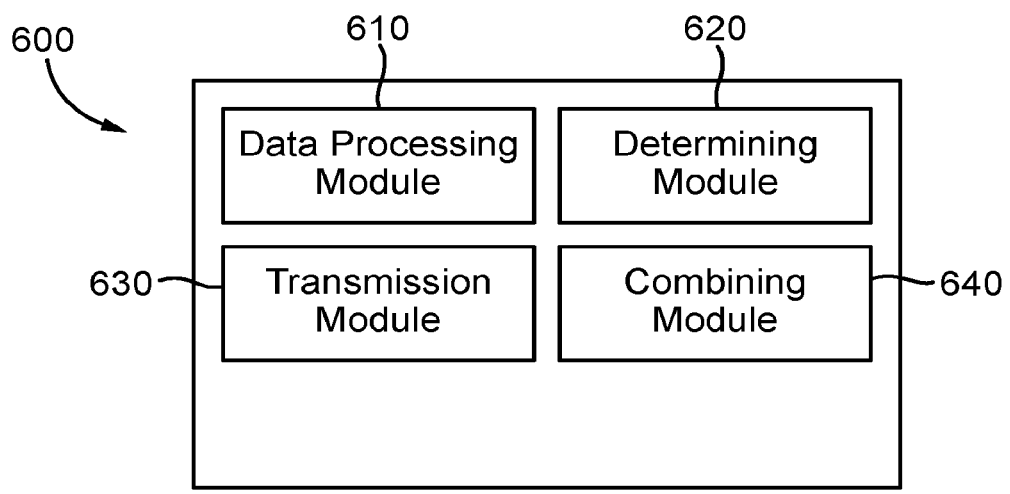
FIG. 6 is a block scheme illustrating a haptic device according to a second embodiment.

A haptic device 600, according to another embodiment, which also can form part of a communication device, or a separate device or node, as described above, will now be described with reference to FIG. 6. The haptic device 600, according to FIG. 6, comprise a plurality of mutually interacting modules or units. More specifically, the haptic device 600, comprises a data processing module 610, for recognizing haptic content captured by a first communication device 101a, corresponding to step 310 of FIG. 3, and properties associated with that captured content, as well as properties associated with a second communication device 101b. Such recognitions can be executed either by passively receiving respective data transmitted from a respective communication device 101a,101b, or by actively requesting relevant data a respective communication device 101a,101b. The haptic device 600, also comprise a determining module 620, for determining, or initiating determination, that more than a first communication device 101a, is to participate in a procedure for capturing haptic content, corresponding to step 330 of FIG. 3. The initiated determination, is based on the haptic content and properties mentioned above, when processed according to predefined rules and conditions, determining under which conditions merging or combination of haptic content from a plurality of communication devices 101a,101b is preferred. As described above, the determining module 620 may also be configured to select haptic data and properties to be provided to a second communication deice 101b, in case not all available data is to be provided, but only data required to be needed for the described process. The latter module may also be capable of determining haptic related instructions for the second communication device 101b. A transmission module 630 is configured to transmit, or initiate transmission, of haptic content from the first communication device 101a, to the second communication device 101b. Possibly also a transmission of instructions from the haptic device 600, is executed, or at least initiated. More specifically, the transmission module 630 either initiates transmission of the mentioned data by way of initiating relevant signaling, e.g. in case the haptic device 600 forms part of a separate device or node, or executes the transmission itself, e.g. if the haptic device 600 forms part of the first communication device 101a.

The data processing module 610 of the haptic device 600, is also configured to recognize haptic content captured by the second communication device 101b, which is received after the second communication device 101b has received haptic content from the first communication device 101a, corresponding to step 350 of FIG. 3. A combining module 640, is configured to combine haptic content and properties acquired from the two communication devices 101a,101b, so that enriched and/or complete haptic content can be obtained for direct distribution or storage for later use.

For both the embodiments described above, in case the haptic device 500,600, is forming part of a communication device, at least one of the communication devices need to be adapted accordingly, while the remaining communication devices can be configured as conventional haptic enabled communication devices. In case the haptic device 500,600 is instead configured as or forming part of a separate entity, such as e.g. a server, both communication devices can be configured as conventional, haptic enabled communication devices which are providing and receiving data according to events initiated by the haptic device.

It is to be understood that the choice of names for the mentioned modules are only for exemplifying purpose, and that devices or physical entities suitable to execute a method according to any of the methods described above may be configured in a plurality of alternative ways, where other modules are applied, in order to be able to execute the suggested procedure actions, as long as the mentioned functionality is configured to interact as disclose herein.

The invention claimed is:

1. A method of capturing haptic content of an object, when the capturing involves a plurality of communication devices, the method comprising:
   recognizing haptic content captured by a first communication device and properties associated with the captured haptic content;
   recognizing properties associated with a second communication device;
   initiating determining, at least partly based on the acquired properties, that the second communication device is to participate in the capturing of the haptic content;
   recognizing haptic content captured by the second communication device; and
   initiating combination of the haptic content captured by the first communication device with the haptic content captured by the second communication device.

2. The method according to claim 1, wherein the properties comprise at least one of:
   haptic sensor related characteristics;
   haptic actuator related characteristics;
   type of object;
   type of haptic data, and
   communication device related characteristics.

3. The method according to claim 1, wherein the determining is initiated based on the recognized properties in combination with at least one of:
   a location of the second communication device;
   a difference in capabilities between the first and the second communication device;
   a distance between the first and the second communication device, and
   a quality of the haptic content captured by the first communication device.

4. The method according to claim 1, wherein the recognition of haptic content captured by the second communication device is combined with recognizing properties associated with the capturing of haptic content by the second communication device.

5. The method according to claim 1, wherein the determining comprises:
   initiating selection of haptic data and properties, captured by the first communication device, to be transmitted to the second communication device.

6. The method according to claim 1, wherein the combining comprises one of:
   combining haptic content captured by the communication devices in parallel; and
   combining haptic content captured sequentially by each of the communication devices.

7. A haptic device for capturing haptic content of an object, involving a plurality of communication devices, the haptic device comprising a processing circuitry comprising a processor and a memory, comprising executable instructions which when executed on the haptic device causes the haptic device to:
   recognize haptic content captured by a first communication device and properties associated with the captured haptic content;
   recognize properties associated with a second communication device;
   initiate a determining, at least partly based on the recognized properties, that the second communication device is to participate in the capturing of the haptic content;
   recognize haptic content captured by the second communication device; and
   initiate combining of the haptic content captured by the first communication device with the haptic content captured by the second communication device.

8. The haptic device according to claim 7, wherein the properties comprise at least one of:
   haptic sensor related characteristics;
   haptic actuator related characteristics;
   type of object;
   type of haptic data; and
   communication device related characteristics.

9. The haptic device according to claim 7, wherein the haptic device is configured to initiate the determining based on the recognized properties in combination with at least one of:
   a location of the second communication device;
   difference in capabilities between the first and the second communication device;
   a distance between the first and the second communication device; and
   a quality of the haptic content captured by the first communication device.

10. The haptic device according to claim 7, wherein haptic device is further configured to recognize properties associated with the capturing of haptic content by the second communication device when recognizing haptic content captured by the second communication device.

11. The haptic device according to claim 7, wherein haptic device is further configured to initiate selection of haptic data and properties, captured by the first communication device, to be transmitted to the second communication device, when determining that the second communication device is to participate in the capturing of haptic content.

12. The haptic device according to claim 7, wherein the haptic device is configured to execute the combining by also executing at least one of:
   combining haptic content captured by the communication devices in parallel; and
combining haptic content captured sequentially by each of the communication devices.

* * * * *